Jan. 16, 1968  B. J. MILLER  3,363,684
METHOD OF RECOVERY BY INCREASED DENSITY FLUID
Filed June 26, 1964  3 Sheets-Sheet 1
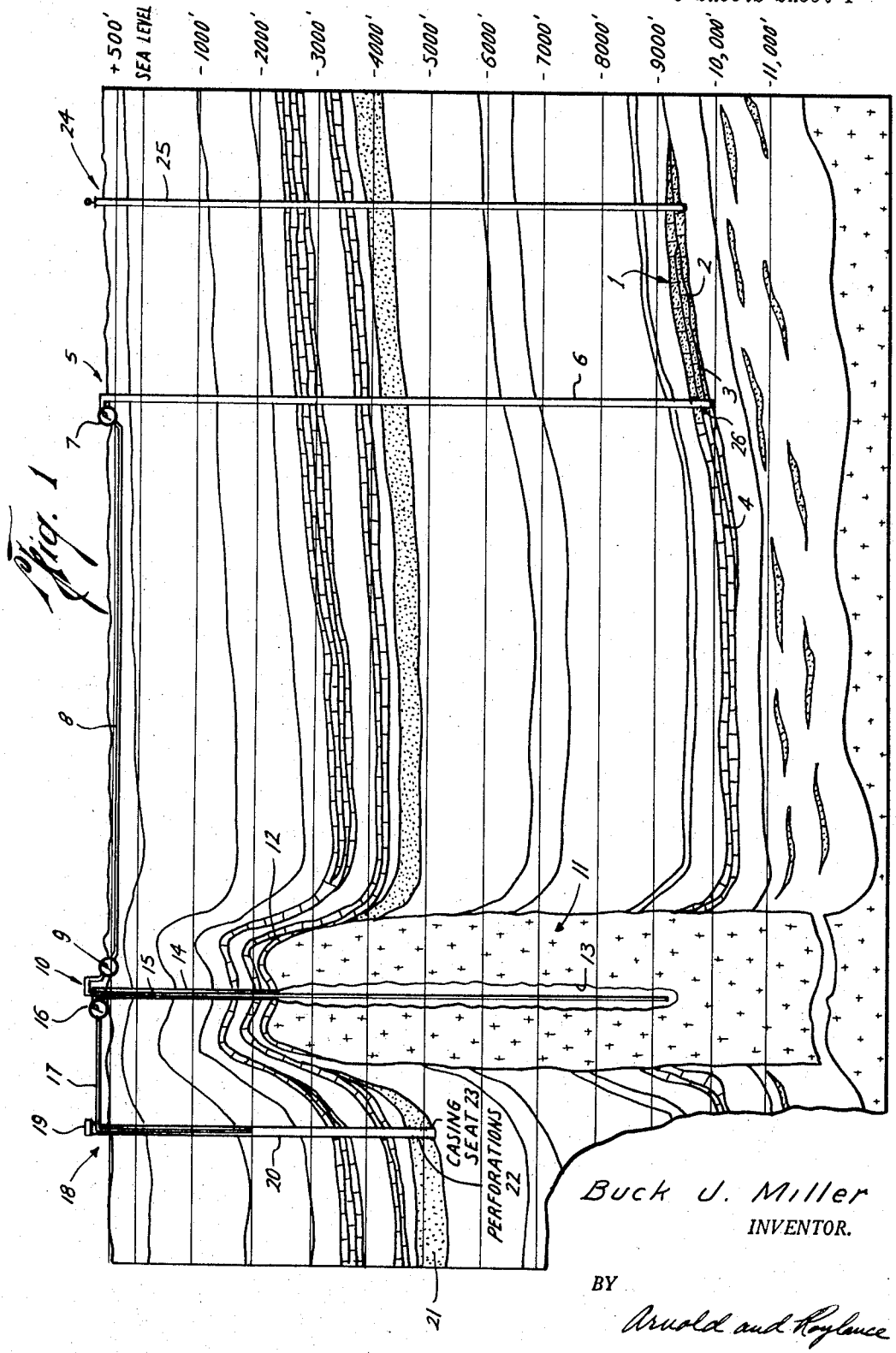
Buck J. Miller
INVENTOR.
BY
Arnold and Roylance
ATTORNEYS Jan. 16, 1968 B. J. MILLER 3,363,684
METHOD OF RECOVERY BY INCREASED DENSITY FLUID
Filed June 26, 1964 3 Sheets-Sheet 2
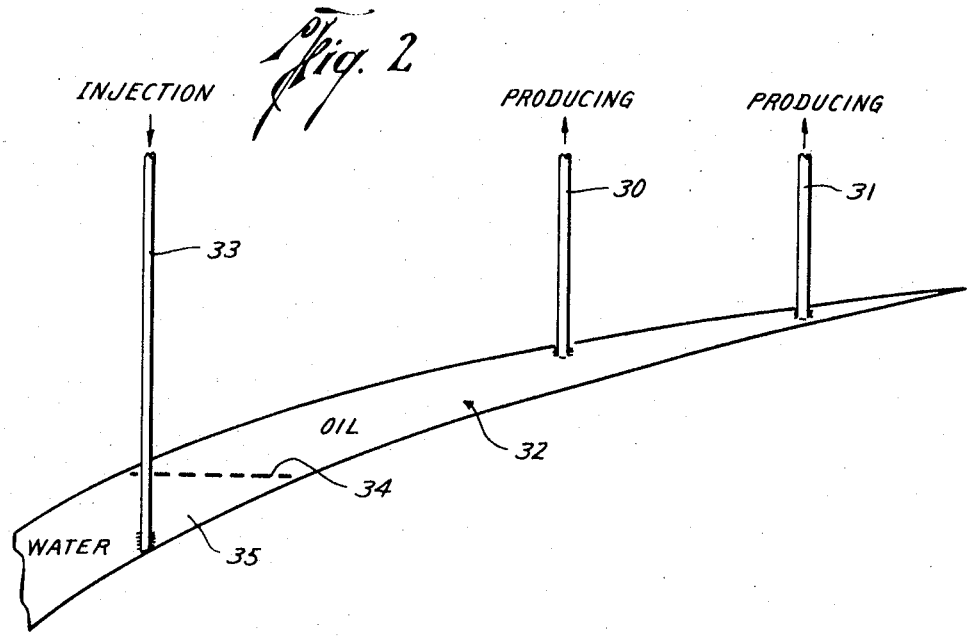
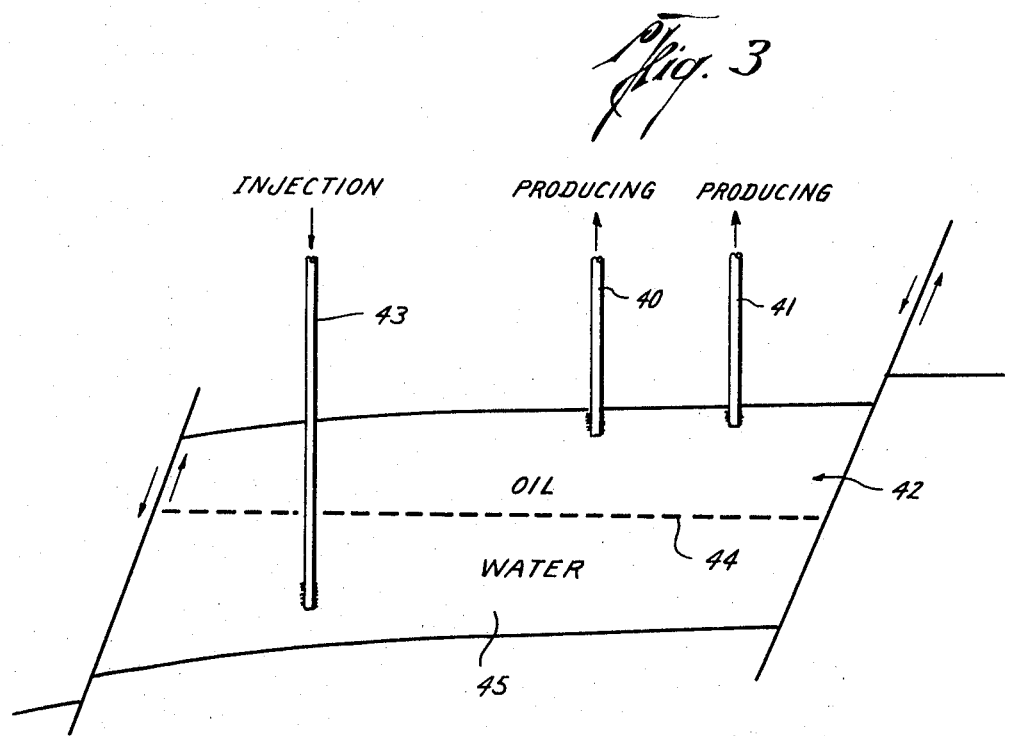
Buck J. Miller
INVENTOR.
BY
Arnold and Roylance
ATTORNEYS

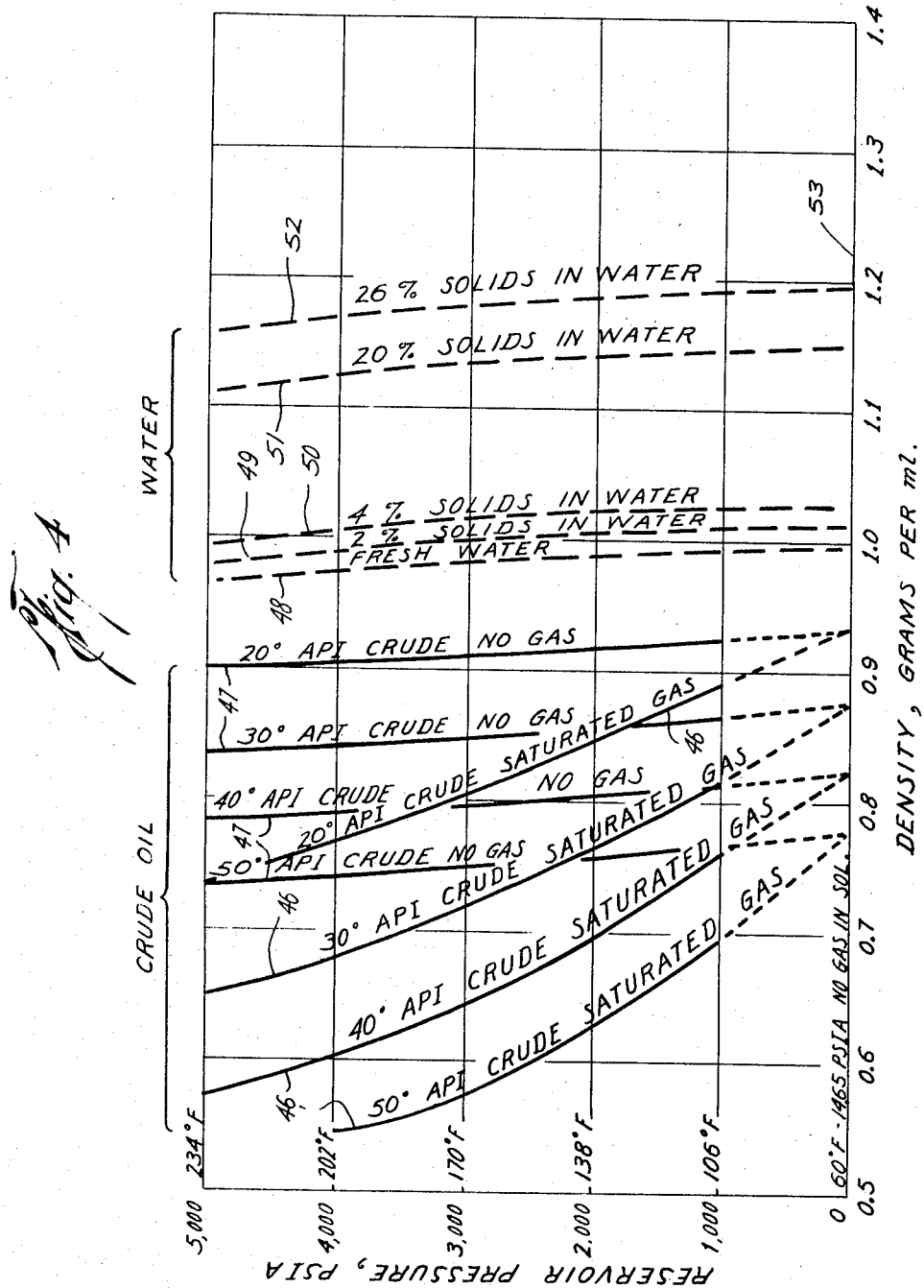

United States Patent Office 3,363,684
Patented Jan. 16, 1968

3,363,684
METHOD OF RECOVERY BY INCREASED DENSITY FLUID
Buck J. Miller, 4401 Stanhope Ave., Dallas, Tex. 75205
Filed June 26, 1964, Ser. No. 378,138
6 Claims. (Cl. 166—9)

This invention relates to a method of flooding oil producing formations for the recovery of oil therefrom and more particularly to an improvement in the method of flooding oil producing formations using a substance having a high density for the recovery of oil.

Flooding has long been a technique used in connection with the secondary recovery of oil from oil producing formations. Although in the past secondary recovery has most often been used with producing formations only after they had been depleted to the extent that it was no longer economical to produce oil by primary recovery means, it is a current trend finding much favor in the industry to use secondary recovery techniques after only about ten percent of the oil from a reservoir has been produced. Therefore, secondary recovery techniques are really now being applied even during the primary recovery period.

The most common method of secondary recovery flooding used in the past has been the injection of available water directly into the oil producing formation by means of a bore hole. An improvement to this method is flooding by the pumping of water to a location in the producing formation that is below the oil. The producing formation, being more porous than the surrounding strata, is saturated so that the pressure of the water pushes the oil remaining in the formation to the vicinity of the oil wells, from which it is produced.

Among the improvements that have been made to the basic technique of flooding just described have been Doherty 1,885,807 and Atkinson 1,651,311. Doherty teaches that by forcing gas into the area above the producing formation it is possible to decrease the normal resistance pressure of the oil being "pushed" by the flooding water.

Atkinson 1,651,311 teaches that by adding an alkali solution to the flooding water it is possible to cause the adhesive bond between the oil and sand particles to dissolve. This allows the oil dislodged from the sand to float or flow to a higher level of the oil reservoir from whence such oil is removed.

Although flooding has increased the amount of oil recovery, and various techniques have been used to increase the efficiency of the recovery, there has not heretofore been devised a satisfactory technique that would economically extend the recovery of a natural oil mixture with, for instance, gas, having approximately the same relative density as the flooding water used when employed with the technique of injecting the flooding water at a level below the oil.

Also, there has not previously been employed a secondary recovery technique such as the one described herein in that enhances the recovery of oil in a substantial number of production situations by flooding with a substance having a density which is much greater than the density of the oil being produced.

Therefore, the method illustrated and described herein is a preferred method of flooding an oil producing reservoir with considerable structural relief dimension, such as a varying or an unusually thick pay section, for the recovery of oil, which comprises:

obtaining water in sufficient quantity for flooding the reservoir,
passing said water to be used in the flooding operation through a heavy density substance, typically by pumping the water through a well bore located in a sodium chloride formation, for producing an admixture having a ratio by weight of solid particles to liquid of approximately one to four,
drilling an input well to a level near the bottom of the oil producing formation,
transporting said admixture through a pipeline or the like to said input well, and
pumping said admixture down said input well until a sufficient quantity is supplied to the oil producing formation to float the oil stored therein to the vicinity of an oil producing well,
whereby oil can be recovered by said oil producing well more efficiently.

More particular description of the invention may be had by reference to the appended drawings, which form a part of this specification. It is to be noted, however, that the appended drawings illustrate only typical applications of the invention and, therefore, are not to be considered limiting of its scope for the invention will admit to other equally effective applications depending on the particular field conditions.

In the drawings:

FIG. 1 is a cross sectional diagram of land depicting typical conditions existing in and around an oil producing formation.

FIG. 2 is a schematic diagram of a cross section of land showing an oil producing reservoir having a considerable relief.

FIG. 3 is a schematic diagram of a cross section of land showing an oil producing reservoir having a thick pay section.

FIG. 4 is a graphical diagram of the increased efficiency that can be expected by using the teachings of this invention.

In the drawings, reference numerals have been employed to indicate parts as follows:

| | |
|---|---|
| 1—oil reservoir | 29—not used |
| 2—oil | 30—producing well No. 1 |
| 3—bottom of oil bearing rock | 31—producing well No. 2 |
| 4—water bearing rock | 32—reservoir |
| 5—dense water input well | 33—injection well |
| 6—well bore | 34—bottom of oil bearing rock |
| 7—pump | 35—water bearing rock |
| 8—pipeline | 36—not used |
| 9—pump | 37—not used |
| 10—increased salinity well | 38—not used |
| 11—salt formation | 39—not used |
| 12—cap rock | 40—producing well No. 1 |
| 13—leached cavity | 41—producing well No. 2 |
| 14—well bore | 42—reservoir |
| 15—return well pipe | 43—injection well |
| 16—pump | 44—bottom of oil bearing rock |
| 17—pipeline | 45—water bearing rock |
| 18—water supply well | 46—gas saturated oil lines |
| 19—pump | 47—no gas oil lines |
| 20—well casing | 48—fresh water line |
| 21—water formation | 49—two percent solids line |
| 22—perforations | 50—four percent solids line |
| 23—casing seat | 51—20 percent solids line |
| 24—oil producing well | 52—26 percent solids line |
| 25—well bore | 53—maximum saturation point |
| 26—perforations | |
| 27—not used | |
| 28—not used | |

Referring to the drawings, and first to FIG. 1, the cross section of the land in and around an oil producing formation appears generally as shown. Typically, there is an oil reservoir formation, such as indicated generally by reference numeral 1, which is more porous than the surrounding non-producing strata. The producing formation is usually, for instance, very sandy.

When initially tapped, a producing oil well 24 is drilled so that well bore 25 opens into the reservoir as shown. The crude production fluid, or oil 2, in the producing layer may vary over a wide range of densities, depending mostly upon the quantity of natural gas mixed with the oil. It can be assumed for the present that the density of the oil very closely approximates that of "fresh" water, i.e. the water that is readily available for flooding, which may be from a well, river, lake, ocean, or other.

Although for a period of time it may be possible to produce the oil by conventional primary recovery techniques, after a period of time, there occurs one or both of the two following conditions: (1) there is a decrease in the quantity of fluid and (2) there is an increase in the number of contaminates in the fluid. The more contaminates, of course, the lower is the grade of the fluid produced and the less economical it is to refine.

At some stage, whether it is at the time the reservoir is "exhausted" or at the time when it appears that secondary recovery techniques will economically benefit production (which may be considerably short of "exhaustion" and as soon as possible only ten percent of the oil has been depleted from the reservoir), a decision will be made to treat the producing reservoir for secondary recovery. This treating for "secondary" recovery then only enhances primary recovery or blends the primary and secondary recovery periods together.

When this decision is made, the teachings of the present invention can be applied provided the producing stratum has an appreciable dimension. This may be as a result of the stratum having a considerable structural relief or as a result that the pay section has an appreciable thickness dimension. In either event, the top and bottom of the oil reservoir must differ by a considerable elevation. As illustrated, bottom 3 of the oil producing formation is at a considerably deeper level than the elevation at which the producing well is located.

The object of secondary recovery is to concentrate the oil remaining in the reservoir in the vicinity of the base of the production oil well, the primary recovery having partly exhausted the oil originally located in the reservoir near the base of the production well. One of the most satisfactory means for preparing the reservoir for secondary recovery is by flooding with water.

The source of water shown in the drawings is a water supply well 18 whose bore is drilled into a water formation 21, which may be a prolific subsurface aquifer such as Woodbine Sand. The casing seat 23 of the well contains perforations 22 through which the water from the formation is pumped to the surface by pump 19. This pump, and the other pumps used in the system described herein may be an ordinary turbine pump, a centrifugal pump, a gas lift pump, or any other suitable pump commonly used in the industry.

Although a water well is shown, any convenient supply of flooding water, such as a running stream or river, a lake, or the ocean, is satisfactory. The well being placed into Woodbine Sand can, at the most, be assumed to contain approximately four percent solids by weight.

The supply water is transported through pipeline 17 by the action of pump 19 to increased salinity well 10. Well 10 has a well bore 14 drilled into a salt formation, such as an intrusive salt dome or mound, generally indicated by reference numeral 11, which is naturally capped by cap rock 12.

It will be understood that salt formations consisting primarily of halite are found in the earth in many parts of the world, such beds usually varying from a few feet to about 3000 feet in thickness. Halite (commonly called rock salt) is primarily sodium chloride but usually contains certain impurities. These halite formations are useful in this invention. Also useful in this invention in certain contexts of use is polyhalite, a naturally occurring potash salt ($2CaSO_4 \cdot MgSO_4 \cdot 2H_2O$) which is found in Texas and New Mexico. Therefore, the term "salt" as used herein is not limited to sodium chloride, or even halite, but is used in its broad sense to include as well other useful salts, such as polyhalite.

Pump 16 forces the water supplied from pipeline 17 down well bore 14 into the salt formation, preferably at subsurface temperatures, thereby percolating the water through the mound to form a leached cavity 13. It is necessary to use pump 16 since the action of the water in the mound admixes with the salt so that the return water up through return well pipe 15 is at a much greater density than the water from pipeline 17.

Pump 9 acts as a pump for drawing the high salinity water to the surface as well and for providing the impetus for transporting the fluid through pipeline 8.

The water that enters pipeline 8 is the flooding water to be used to prepare the oil formation for secondary recovery. It is desirable that the density of the water has been increased such that there is an approximate ratio by weight of salt and other solids in the admixture to water of 1 to 4.

It is expected that a pipeline 8 of up to 40 miles in length can be used without encountering any difficulty. Even longer lengths can probably be used with necessary adaptations for long line transmission.

Also, for maintaining the necessary solution density, it is possible to insulate and/or pressurize pipeline 8.

A well 5 is drilled into the oil reservoir formation so that its well bore 6 extends into the formation at a point near the bottom of the reservoir. In the diagram, perforations 26 open into the formation below line 3, which marks the approximate bottom of the reservoir in water bearing rock 4.

The high density water is pumped down input well 5 by pump 7 in continuous quantity so that the local formation area in the vicinity of the bases of wells 5 and 24 becomes saturated with the heavy density water. It is still assumed that the crude oil to be recovered in the reservoir approaches the density of fresh water, which is of lesser density than the flooding water being supplied. Therefore, as the heavy density flooding water is supplied, the oil in the reservoir is displaced and floated to the surface of the newly added flooding water. Since the base of the production well 24 is strategically located to take advantage of the oil displacement, the oil becomes concentrated in the area near the base of well 24. Normal production techniques are then used to take advantage of the enriched formation.

The flooding technique just described can be used when the oil reservoir has a configuration either as shown in FIG. 2 or as shown in FIG. 3. FIG. 2 shows a strip formation that meanders so that the oil producing section is closer to sea level than a non-producing part of the same section. FIG. 3 shows a reservoir having a thick structural relief such that the overall thickness is in excess of fifty feet. In both cases there is a considerable structural relief dimension.

When the relief structure is as shown in FIG. 2, the production wells 30 and 31 are located near the upper limit of the reservoir 32. The flooding water is injected through well 33 into that part of the producing stratum which is below line 34, which in FIG. 2 marks the approximate boundary between the producing formation and the non-producing formation within the same reservoir.

Similarly, when the producing formation is part of a relief structure as shown in FIG. 3, the production wells 40 and 41 are located to produce the oil from area 42, the oil producing section of the reservoir. The line between the oil and that section of the reservoir into which water is located is marked 44. The injection well 43 is drilled well below line 44 and may be located anywhere within area 45 just so long as the bottom of well 43 inserts water to take advantage of the floating action.

In the discussion above, it has been assumed that the crude oil to be produced was very nearly the same density as the flooding water that was readily available. Therefore, it was necessary to increase the density of the flooding water to obtain the large density difference which produced the improved recovery results.

The situation where the crude oil and the available flooding water are of approximately the same density is only one example of using the teachings of this invention. Even in situations in which there is already an existing density difference between the available water and the crude oil, efficiency can be significantly increased by increasing the density of the flooding water.

It is believed that the upper limit under normal atmospheric conditions of dissolved solids in water is approximately 300,000 parts per million or 30 percent by weight. Under typical subsurface pressure and temperature conditions (density is a function of conditions such as temperature and pressure as well as a function of the solid-particle additive), this practical upper limit is somewhat less, probably on the order of 20–26 percent. Even so, this is a significant increase over natural formation waters, such as sea water, having dissolved solids which rarely exceed 40,000 parts per million, or 4 percent. Most often the ratio is closer to 2 percent. The typical examples described below reveal how high density flooding water greatly increases recovery efficiently.

A crude oil of 30° API gravity saturated with gas at a reservoir pressure condition of 5000 pounds per square inch absolute and a reservoir temperature condition of 234° F. has a density of approximately 0.65 gram per milliliter. Under the same conditions, fresh water has a density of approximately 0.9671 gram per milliliter. The density difference between the crude oil and fresh water in the reservoir is 0.9671 less 0.65 or 0.3171 gram per milliliter.

Suppose now that a mixture of water and sodium chloride which is approximately 26 percent sodium chloride by weight is used rather than fresh water. This mixture has, at the same environmental conditions given above, a density of approximately 1.1599 gram per milliliter, or a density difference compared with the crude oil of 1.1599 less 0.65 or 0.5099 gram per milliliter. This is an increase of approximately 60 percent in the density difference when using the heavy density water rather than fresh water. In actual practice, an increase in density difference of 30 percent to 100 percent can be achieved above the use of naturally occurring waters.

FIG. 4 is a showing of reservoir situations for various conditions of production crude oils and injected waters, thereby becoming a convenient tool for predicting when the teachings of this invention are most fruitful.

The graph shown in FIG. 4 is a plot of reservoir pressures in pounds per square inch absolute versus density in grams per milliliter. Temperature conditions typically prevailing at the various pressure conditions are also listed.

The density of crude oil of various API ratings which are completely saturated with natural gas are shown by lines 46. The density of crude oil of the same API ratings which contain no gas at all are shown by lines 47. The actual prevailing conditions most often occurring will be a condition of partial gas saturation, or represented by lines having slopes somewhere between lines 46 and 47.

The density for fresh water, which is essentially free of additives, is shown by line 48. The density for typical natural water containing solid particles, the two percent (by weight) solids line, is shown by line 49. The four percent solids line is line 50.

Lines 51 and 52 show respectively the density of conditions for water having 20 percent and 26 percent solids, typically sodium chloride. Finally, point 53 designates the believed maximum saturation limit for sodium chloride solid particles dissolved in water.

To calculate the density difference for a particular situation between the proposed flooding water to be used and the crude oil to be produced, it is first necessary to determine the prevailing subsurface environmental conditions that most resemble a condition listed on the vertical axis. Then it is necessary to trace horizontally until the line 46 or 47 or a line interpolated between them is reached that most resembles the condition of the crude oil to be produced. The density is then recorded from the horizontal scale. Next, it is necessary to follow horizontally along the prevailing conditions line until the type of flooding water most like the one to be used is reached and to record the density from the horizontal scale. The density difference is obtained by subtracting these two recorded values.

Other density differences can be similarly calculated for alternately proposed flooding waters and compared. The higher that the density difference is, the greater will be the efficiency.

It is apparent that the least percent advantage of using high density flooding water, rather than water naturally occurring in nature, is obtained when there is considerable gas mixed with the crude oil (with the lighter crude oils) and at a high pressure and temperature condition. Still a percent increase in efficiency of 30 percent can be expected.

When there is little or no gas dissolved in the crude oil, there is a much larger advantage in using the teachings of this invention. It may be seen that efficiency in some instances increases by as much as three times.

It should be noted that by merely increasing the density of the flooding water, the separation of fluids within the partly exhausted producing formation is more complete with no reliance on decreasing wettability of the fluids, increasing the alkalinity content.

It should also be noted that in the event the dissolved solids in the water pumped out of increased salinity well 10 is in excess of that which can be maintained in solution at the temperature of the oil producing formation, it is possible to blend or add by means of a bypass a sufficient amount of water from water supply well 18, or some other source, to reduce the dissolved solids in the resulting mixture below the level that can be maintained at the oil reservoir temperature and pressure.

While the invention has been described in relation to particular structural relief formations, particular materials, and particular suggested equipment, it is obvious that various substitutes may be made without varying from the scope of the invention.

What is claimed is:

1. A method of conditioning an oil producing formation having a considerable difference in elevation, for recovery of oil, which comprises:

obtaining water in sufficient quantity for flooding the reservoir, passing said water through a water-soluble solid-particle formation having a density greater than the density of said water, to produce an admixture having a ratio by weight of solid particles to liquid of at least about one to four, and said admixture consequently having a density greater than the density of said water and considerably greater than the oil to be produced, drilling at least one input well to a level near the bottom of the oil producing formation, transporting said admixture to said input well, pumping said dense admixture down said input well until a sufficient quantity is supplied to the oil producing formation near the bottom of said formation, to float the oil stored therein to the vicinity of an oil producing well, whereby oil can be recovered by said oil producing well which is not otherwise recoverable.

2. A method of conditioning an oil producing formation in accordance with claim 1, wherein said step of passing said water to be used in the flooding operation through a solid-particle formation includes:
  pumping said water through a well bore leading to a salt formation so as to form a heavy density admixture as said water mixes with said salt, and
  recovering said heavy density admixture through another well bore leading to said salt formation.

3. A method in accordance with claim 1, wherein the admixture produced by passing said water to be used in the flooding operation through a solid-particle formation produces an admixture of water and dissolved solids.

4. A method of conditioning an oil producing reservoir for the recovery of oil, said reservoir having a considerable difference in elevation top to bottom, and said reservoir further having an oil producing formation and a nonproducing formation below said producing formation, comprising:
  providing water in sufficient quantity for flooding said reservoir;
  passing said water through a formation of water-soluble particles having a density greater than water, whereupon said water forms an admixture with said particles, said admixture having a density greater than water and considerably greater than the density of the oil to be produced;
  drilling at least one input well into the nonproducing formation of said reservoir; and,
  delivering said admixture in sufficient quantity through said input well into the nonproducing formation of said reservoir to float the oil in said oil producing formation of the reservoir to the vicinity of an oil producing well,
  whereby oil can be recovered by said producing well which is not otherwise recoverable.

5. The method in accordance with claim 4, wherein said water-soluble particles are salt particles.

6. The method in accordance with claim 4, wherein the density of said admixture is at least one-fifth greater than the density of the oil produced.

References Cited

UNITED STATES PATENTS

| | | | |
|---|---|---|---|
| 1,651,311 | 11/1927 | Atkinson | 66—9 |
| 1,885,807 | 11/1932 | Doherty | 166—9 X |
| 2,880,587 | 4/1959 | Hendrix et al. | 166—9 X |
| 2,903,065 | 9/1959 | Holbrook et al. | 166—9 |
| 3,066,732 | 12/1962 | McEver | 166—7 |
| 3,104,702 | 9/1963 | Gaskell et al. | 166—9 |
| 3,125,072 | 3/1964 | Brandt et al. | 166—4 |
| 3,227,210 | 1/1966 | Trantham | 166—9 |
| 3,237,692 | 3/1966 | Wallace et al. | 160—40 |
| 3,251,412 | 5/1966 | Cooke et al. | 166—9 |

OTHER REFERENCES

Hughes, et al.: "Advantages of Brines in Secondary Recovery of Petroleum by Water-Flooding," Transactions of the American Institute of Mining and Metallurgical Engineers, Petroleum Division, Petroleum Development and Technology, 1947, vol. 170 (pp. 187–201).

STEPHEN J. NOVOSAD, *Primary Examiner.*

ERNEST R. PURSER, *Examiner.*